July 25, 1967
R. E. WALKER ET AL
3,333,258
FOOLPROOF SYSTEMS FOR SENSING BOTH NORMAL AND
ABNORMAL CONDITIONS
Filed Feb. 13, 1964
2 Sheets-Sheet 1
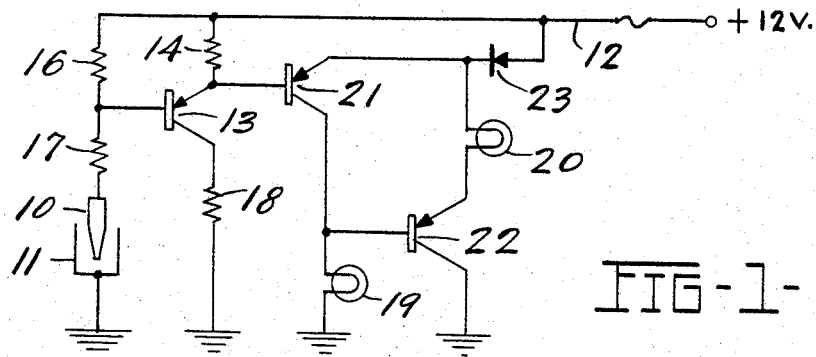
FIG-1-
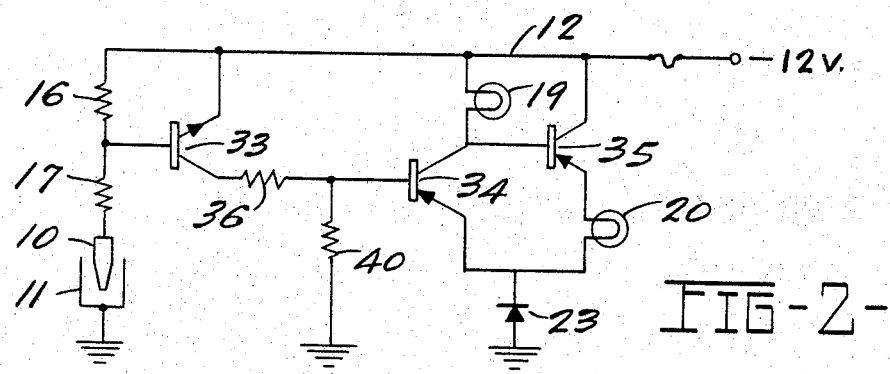
FIG-2-
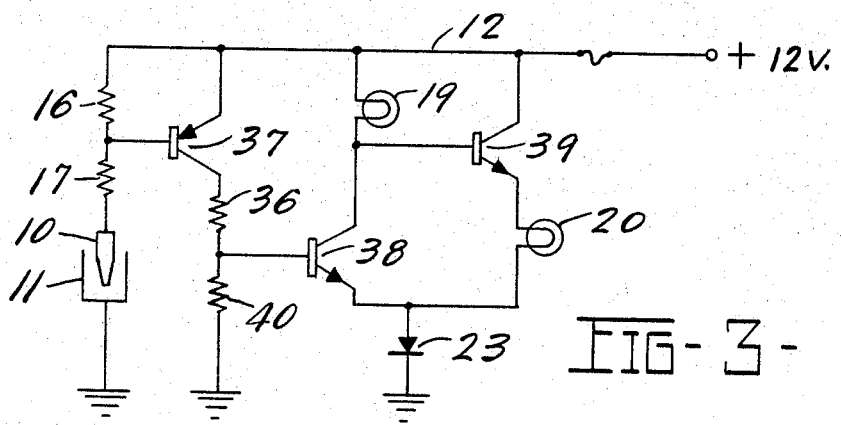
FIG-3-
INVENTORS:
RICHARD E. WALKER.
JAMES D. HECKELMAN.
BY Owen & Owen
ATT'YS.

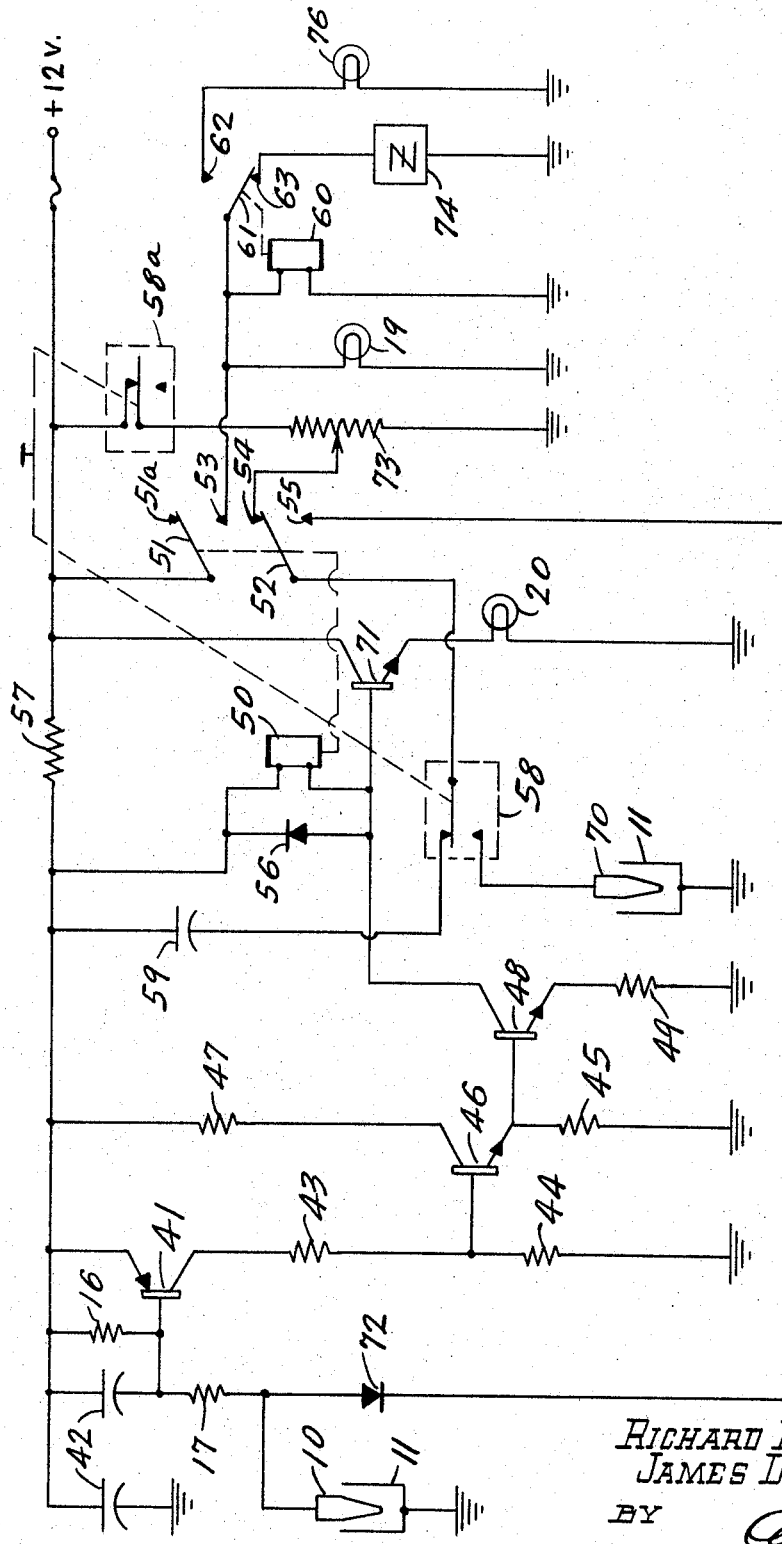

United States Patent Office 3,333,258
Patented July 25, 1967

3,333,258
FOOLPROOF SYSTEMS FOR SENSING BOTH
NORMAL AND ABNORMAL CONDITIONS
Richard E. Walker, Cadiz, and James D. Heckelman,
Huron, Ohio, assignors to Harrison Electronics, Inc.,
Cadiz, Ohio, a corporation of Ohio
Filed Feb. 13, 1964, Ser. No. 344,641
12 Claims. (Cl. 340—244)

This invention relates in general to electrical conductivity sensing circuits, and more particularly to such circuits using solid state sensing circuitry for detecting the presence of an electrically conductive liquid.

Although the improved circuitry used in the present invention will have utility in indicating the existence of a predetermined small flow of electricity and/or perform a control function in response to a change in a predetermined small flow of electricity, it has particularly advantages when used in conjunction with apparatus for detecting the presence of water or other electrically conductive liquid.

One application wherein the present invention has particular advantages is in the detection and/or control of water in organic fuel systems, such as the fuel used for jet aircraft, tanks, diesel engines, and the like. In such systems, a pair of spaced electrodes are placed in contact with the fuel, and when water bridges the gap between the electrodes, a flow of electricity takes place which produces a signal or causes a measure of control to take place to get rid of the water. The electrodes may be placed in the bottom of separators, filters or fuel tanks since the water is usually heavier than the fuel. In those instances where the container for the fuel is made of an electrically conductive material that is in contact with the liquid contents, the container itself can act as one electrode and the other electrode may consist of a single probe which projects into the vessel and is insulated therefrom. In the type of operation above described, the probe will usually be coated with oil, so that it is only periodically in contact with the water. In such systems the service life of the probe is no appreciable problem.

Another application wherein the present invention has particular advantages is in the indication of the presence of coolant in the cooling system of an internal combustion engine. The usual system which is used to indicate proper cooling of an internal combustion engine utilizes a temperature sensing element positioned in the cooling jacket of the engine. Under some conditions, such as occurs upon a sudden rupture of hoses, etc., the liquid level can drop below the temperature sensing element before the temperature of the sensing element has time to increase appreciably. Once the liquid level drops below the temperature sensing element, the temperature of the engine is no longer sensed by the element and damage can occur to the engine. According to one aspect of the present invention, a system is provided for providing an indication when the coolant in the cooling system falls below a predetermined level to give advance notice of a possible dangerous condition. Several difficulties occur, however, in a system wherein the electrodes are continuously in contact with the electrically conductive liquid. One difficulty is that the electrodes have short service lives due to the plating out of one electrode upon the other. In coolant systems wherein the coolant confining surfaces are metallic, either the surfaces of the system or the electrode tend to be eaten away by the continuous electroplating action.

An object of the present invention is the provision of new and improved circuitry which will operate an indicating or control device in response to a signal involving a small change in current flow, and which comprises a minimum of parts which are rugged and efficient in operation, and inexpensive to manufacture.

Another object of the invention is the provision of a system for detecting an electrically conductive liquid in which small differences in DC potential are applied to the electrodes and small current flows are therefore produced between the electrodes, and which further requires small voltages and flow of electricity to produce an indication or measure of control in response to a change in conductivity between the electrodes.

A further object of the invention is the provision of a system of the above described type in which the electrodes are normally in communication with the electrically conductive liquid and substantially no plating action takes places.

Further objects and advantages will become apparent to those skilled in the art to which the invention relates from the following description of several preferred embodiments described with reference to the accompanying drawings forming a part of this specification, and in which:

FIG. 1 shows one form of probe sensing system for furnishing visual indication of the liquid level;

FIG. 2 is a variation of FIG. 1 suitable for a negative voltage supply;

FIG. 3 is another form of the FIG. 1 circuit in which the red and green light switches are NPN transistors; and FIG. 4 is a complete one or two probe circuit including visual indication as well as a control for the liquid level.

In the circuit of FIG. 1, the probe 10 is immersed in liquid container 11 which may be the coolant system of an internal combustion engine. The container 11 is at ground whereas a positive twelve volts is applied to line 12 through a fuse. By making the cooling system negative its surfaces are prevented from plating out, and according to principles of the invention it has been found that a probe 10 of a certain material, namely carbon, substantially completely eliminates plating and probe deterioration. A PNP transistor 13 has its emitter connected to the plus side of the line through resistor 14, and a parallel circuit including the base of transistor 21 and diode 23. Base resistor 16 and current limiting resistor 17 supply plus voltage to the probe 10. The collector of transistor 13 is energized through resistor 18, which limits the emitter-collector current. Alternate lamps 19 or 20 are energized to provide green or red indications respectively by current flow through the collector-emitter paths of PNP transistor 21 or 22. A biasing diode 23 forwardly poled completes the alternate lamp paths to the plus side of the line.

During normal operation when the probe is immersed in liquid, the conductivity of the liquid is sufficiently high to permit sufficient current flow through the emitter-base junction of transistor 21. The normal current flow is therefore through diode 23 and the emitter-collector path of transistor 21 to cause green lamp 19 to be energized. Since the forward voltage drop across transistor 21 is extremely low, transistor 22 is maintained biased off and the warning red lamp 20 is extinguished. If the liquid level should fall below the probe, transistor 13 ceases conducting and transistor 21 becomes biased off causing lamp 19 to turn off and simultaneously causing lamp 20 to turn on. The emitter-base current flows through lamp 19 but is insufficient to cause lamp 19 to be visible whereas lamp 20 burns brightly due to emitter-collector current of transistor 22. As is true of the other forms of this present invention, it is arranged to be fail-safe causing the red light to be on when the liquid is low or if for some reason the probe lead is broken or the liquid should freeze since in that case no conductivity is possible.

For some applications the arrangement shown in FIG.

2 can be used. FIG. 2 is similar in all respects to FIG. 1 except that it is arranged to operate with a negative voltage supply, and common reference characters are used. NPN transistor 33 is turned on when the conductive liquid is at probe level and the current from emitter to base of PNP transistor 34 and the collector-emitter current of transistor 33 is limited by resistor 36. Green lamp 19 is energized due to emitter-collector current flow through transistor 34. When the liquid level falls, transistors 33 and 34 are biased off and emitter-base current of PNP transistor 35 through lamp 19 causes transistor 35 to conduct heavily causing red lamp 20 to be visible whereas lamp 19 is off due to insufficient current flow therethrough. The resistor 40 is connected between the base of transistor 34 and the potential which makes the transistor 34 non-conductive so as to keep transistor 34 non-conductive except when flow through transistor 33, resistor 36 and resistor 40 takes place.

FIG. 3 is in all respects like FIG. 1 except for the substitution of NPN transistors 38 and 39 to supply current through the lamps 19 and 20. Resistor 36 limits current through the base-emitter of transistor 38 and current through the emitter-collector of transistor 37 when the liquid level is proper, whereas lamp 19 limits base current of transistor 39 when the liquid level falls below the probe. In this latter situation, red lamp 20 is on and lamp 19 off.

It is readily understood that the indication under certain conditions may be expanded to provide a control function and the more complete embodiment is shown in FIG. 4. The sensing probe is connected to the base of PNP transistor 41 in the same fashion. Resistors 43 and 44 are joined at the base of NPN transistor 46. A resistor 45 is connected between negative ground voltage and the emitter of transistor 46 and the base of transistor 48 to hold transistor 48 non-conductive except when current flows through transistor 46 and resistors 45 and 47. Resistor 47 limits the current into the base of transistor 48 and also the collector current of transistor 46. A resistor 49 limits current flow through the emitter of transistor 48. Sufficient current gain is achieved to enable operation of relay 50 which has ganged movable contacts 51 and 52. Diode 56 is reverse poled across relay 50 and serves to protect transistor 48 from an inductive kick generated when the relay is deenergized. Resistor 57 and capacitors 42 contribute to filter any undesired transients appearing in the system. A switch 58 is normally connected to join capacitor 59 to relay contact 52 of relay 50. Alternatively, switch 58 may be adjusted to include a second sensing probe 70 if desired, as will preferably also include a second pole and contacts 58A which disconnect the positive voltage supply to potentiometer 73 when switch 58 connects probe 70 to relay contact 52.

Transistor 71 has its base current limited by relay 50 to cause lamp 20 to turn on whenever transistors 41, 46 and 48 turn off. Alternatively, this lamp could be electrically connected between contact 51a and ground if desired, energization of the transistor 46 can be indicated by a lamp electrically connected across resistor 47. Similarly, energization of transistor 48 can be indicated by a lamp electrically connected across relay 50. In the drawing, an on lamp 19 is connected to terminal 53 and is energized when relay 50 causes contact 51 to energize the lamp. Movable contact 52 rests at terminal 54 when relay 50 is deenergized and upon energization moves to terminal 55 which is a feedback path used in the one probe arrangement. Included in the feedback path is diode 72 which permits base current flow for transistor 41 as a result of the charge on capacitor 59 after the liquid level falls below the probe 10. The charge on capacitor 59 is acquired from the potential available at the tap of drain-time-adjust potentiometer connected to terminal 54.

Terminal 53 is also connected to time delay relay 60 which causes movable contact 61 to move from terminal 63 to terminal 62 after a time delay. Prior to such motion, an output load 74 is energized. The load 74 may cause a drain solenoid or a pump to become energized which causes the liquid level to once again fall below probe 10. The delay period of relay 60 is chosen to be long enough so that it does not trip under normal operation conditions. However, it does trip if a malfunction in the control module, probe, or drain circuit causes the external equipment indicated as load 74 to remain energized longer than is desired. When this off-normal condition exists, an indication is given by visual and/or audible means. FIG. 4 illustrates an off-normal lamp 76 connected to terminal 62 which gives such an alarm.

In operation, when the switch 58 is in its single probe position and when the liquid is below probe 10, capacitor 59 charges to a level set by potentiometer 73. Lamp 20 is turned on. When the liquid reaches the probe 10, transistors 41, 46 and 48 turn on causing relay 50 to pull in and causing transistor 71 and lamp 20 to turn off. Movable contacts 51 and 52 transfer to their energized position. Capacitor 59 transfers its charge through diode 72 when the diode is unblocked. However, the diode is blocked until after the liquid level falls below probe 10. Lamp 19 is turned on and the plus twelve volt line is applied to time delay relay 60 and also to the load 74 through relay contact 61. Under normal operation, the energizing of load 74 causes the liquid level to lower sufficiently so that probe 10 is uncovered. However, load 74 remains energized due to the base current supply for transistor 41 furnished by the discharge of capacitor 59 through diode 72.

After capacitor 59 discharges itself, relay 50 turns off and the voltage supply to terminal 53 is removed. It is understood that the period of energization of load 74 is controlled by the setting of potentiometer 73, and that this period starts after the liquid level leaves probe 10. A misoperation permits time delay relay 60 to pull in disconnecting load 74 and providing an off-normal alarm at lamp 76.

In the two probe operation, switch 58 connects probe 70 in parallel with probe 10 when relay 50 pulls in. Probes 10 and 70 are normally mounted such that they are separated vertically, with probe 10 being located at a higher liquid level than probe 70. Thus, the liquid may fall beneath probe 10 but the load 74 remains energized so long as the level does not drop beneath probe 70. When it falls below probe 70 as well, then relay 50 is deenergized to disable the load 74. In FIG. 4 circuit, it is understood that a negative voltage may be used with transistors of opposite conductivity such as in the case of FIG. 2 herein. It is also understood that FIG. 4 may be modified as desired, for example, in the elimination of the transistor 71 if no off indication is required or elimination of relay 50 and its controls if only an indication is sought. It is also understood that the circuits of FIGS. 1 through 4 inclusive can be modified to accept any supply voltage; DC by use of a voltage divider or equivalent, AC by use of an AC to DC rectifying circuit and filter or equivalent. Also, movable contact 51 of relay 50 can be connected to any power source, not necessarily the positive DC voltage of the transistor circuitry. In this case, on lamp 19, delay relay 60, load 74, and off normal alarm 76 would not be returned to ground, but to the return path of this power source.

While the principles of the invention have now been made clear in several illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefor intended to cover and embrace

What we claim is:

1. In an indicating system: means providing a pair of power supply conductors adapted to be positively and negatively biased with respect to each other, a first transistor having its emitter and collector connected in series circuit between said positively and negatively biased power supply conductors, a first resistance having device in the emitter path of said first transistor, said first transistor being conductive when a potential of a given polarity is supplied to the base of said first transistor, a second resistance having device connected between said base of said first transistor and the one of said power supply conductors of the potential which makes said first transistor conductive, a second transistor having its emitter and collector connected in series between the other of said power supply conductors and said base of said first transistor, said second resistance having device being a signal producing electrical solenoid which is operative to produce a control signal when electricity flows through the emitter-collector circuit to which it is connected, said second transistor being conductive when biased by a relative voltage of one of said conductors, a third resistance device connecting the base of said second transistor to the other one of said conductors, a third transistor having its emitter and collector connected in series circuit between said base of said second transistor and said one of said conductors whose relative voltage makes said second transistor conductive, said third transistor being conductive when biased by a relative voltage by one of said conductors, a resistance between the base of said third transistor and the one of said conductors which makes said third transistor not conductive, and means including a conductive liquid detecting probe having spaced apart electrodes in series circuit between said conductors and adapted to be contacted by said liquid, said means causing a potential to be applied to the base of the third transistor which makes said third transistor conductive when the conductive liquid bridges said electrodes.

2. In an indicating system: means providing a pair of power supply conductors adapted to be positively and negatively biased with respect to each other, a first transistor having its emitter and collector connected in series circuit between said positively and negatively biased power supply conductor, a first incandescent lamp in the emitter-collector path of said first transistor and being located between said emitter and its power supply conductor, said first transistor being conductive when a potential of a given polarity is supplied to the base of said first transistor, a second incandescent lamp connected between said base of said first transistor and the one of said power supply conductors of the potential which makes said first transistor conductive, a second transistor having its emitter and collector connected in series between the other of said power supply conductors and said base of said first transistor, said lamps being operative to produce a signal when electricity flows through the emitter-collector circuit to which it is connected, said second transistor being conductive when biased by a relative voltage of one of said conductors, a third resistance having device connecting the base of said second transistor to the other one of said conductors, a third transistor having its emitter and collector connected in series circuit between said base of said second transistor and said one of said conductors whose relative voltage makes said second transistor conductive, said third transistor being conductive when biased by a relative voltage of one of said conductors, a resistance between the base of said third transistor and the one of said conductors which makes said third transistor not conductive, and a conductive liquid detecting probe having spaced apart electrodes adapted to be contacted by said liquid and which are in series circuit between said base of said third transistor and the conductor whose relative potential makes said third transistor conductive.

3. In a liquid level control system for an electrically conductive liquid: means providing a pair of power supply conductors adapted to be positive and negative with respect to each other, a first transistor having its emitter and collector connected in series circuit between said positive and negative supply conductors, a first resistance providing device in the emitter-collector path of said first transistor between said positive and negative power supply conductors, said first transistor being conductive when a potential of given polarity is supplied to the base of the first transistor, a second resistance providing device connected between said base of said first transistor and the one of said power supply conductors of the potential which makes said first transistor conductive, a second transistor having its emitter and collector connected in series between the other of said power supply conductors and said base of said first transistor, a high level probe having electrodes in series circuit between said positive and negative supply conductors, first circuit means for supplying a voltage to the base of said second transistor which makes said second transistor conductive when electricity flows through said high level probe, a low level probe having a pair of electrodes, first and second normally open switch means, second circuit means including a load device in series circuit with said first switch means, said load device being effective to lower the liquid level from said high level probe when said first switch means is closed, third circuit means in series with said second switch means and said low level probe and effective to supply a voltage to the base of said second transistor which makes said second transistor conductive when conductive liquid bridges the electrodes of said low level probe and said second switch means is closed, one of said first and second resistance providing devices being a solenoid effective to close said first and second switch means when said second transistor is conductive.

4. In the liquid level control system of claim 3: a time delay relay in series circuit with said first switch means, a terminal for a warning device, a third switch which when in a normal condition connects said first switch means to said load device and when in an actuated condition connects said first switch means to said terminal for a warning device, said time delay relay causing said third switch to move to its actuated condition at a predetermined interval of time after it is energized by said first switch means.

5. A liquid level sensing system for providing an indication when the liquid moves below a predetermined level in internal combustion engines and the like, said system comprising: means for providing a pair of power supply conductors adapted to be positively and negatively biased with respect to each other, a first transistor having its emitter and collector connected in series circuit between said positively and negatively biased power supply conductors, a first resistance having signal producing device in the emitter-collector path of said first transistor between said positively and negatively biased power supply conductors for indicating a drop in liquid livel, said first transistor being conductive when a potential of given polarity is supplied to the base of the first transistor, a second resistance having signal producing device connected between said base of said first transistor and the one of said power supply conductors of the potential which makes said first transistor conductive, said second device indicating the normal liquid level, a second transistor having its emitter and collector connected in series between the other of said power supply conductors and said base of said first transistor, an electrical probe positioned to contact the liquid at said predetermined level, said signal producing devices being operative to produce a signal when electricity flows through the respective emitter-collector circuit to which each is connected, circuit means caused to be energized by said probe and connecting said probe to said base of said second transistor to make said second transistor conductive when liquid is contacted by said probe, a resistance connecting said base of said second transistor to said other of said power supply conductors, and said second signal producing device being of a resistance value to turn said first transistor off when current flows through said second transistor and to turn said first transistor on when current does not flow through said second transistor, whereby said second signal producing device is normally energized to indicate liquid level at said predetermined level and said first signal producing device is operated immediately upon de-energization of the probe and circuit means connecting said probe to said second transistor.

6. The system of claim 5 wherein one of said first and second indicating devices is the solenoid of a relay operative to alternatively close first and second circuits, means in said first circuit including a condenser and which charges said condenser when said first circuit is closed, said second circuit being operative when closed to conduct a charge from said condenser to said base of said second transistor to cause said second transistor to be conductive, said relay closing said first circuit when said sensing means deliver said first output signal and closing said second circuit when said sensing means delivers said second output signal.

7. The indicating system of claim 5 wherein said first resistance having device is an incandescent lamp.

8. The indicating system of claim 5 wherein said first resistance having device is an incandescent lamp located in the emitter circuit of said first transistor.

9. The indicating system of claim 5 wherein both resistance having signal producing devices are incandescent lamps.

10. The indicating system of claim 8 wherein said second resistance having device is an electric solonoid for performing a control function.

11. In a liquid level control system for an electrically conductive liquid: means providing a pair of power supply conductors adapted to be positive and negative with respect to each other, a first transistor having its emitter and collector connected in series circuit between said positive and negative supply conductors, a solonoid in the emitter collector path of said first transistor, said first transistor being nonconductive when a potential of given polarity is supplied to the base of said first transistor, a resistance having device connected between said base of said first transistor and the one of said power supply conductors of the potential which makes said first transistor nonconductive, a second transistor having its emitter and collector connected in series between the other of said power supply conductors and said base of said first transistor, a high level probe having electrodes in series circuit between said positive and negative supply conductors, first circuit means for supplying a voltage to the base of said second transistor which makes said second transistor conductive when electricity flows through said high level probe, first and second normally open switch means, second circuit means including a load device in series circuit with said first switch means, said load device being effective to lower the liquid level from said high level probe when said first switch means is closed, and third circuit means in series with said second switch means and effective to supply a voltage to the base of said second transistor which makes said second transistor conductive at least for a predetermined period of time when said second switch means is closed, said solonoid being effective to close said first and second switch means when said first transistor is conductive.

12. In the liquid level control system of claim 11: a time delay relay in series circuit with said first switch means, a terminal for providing a signal to an off-normal indicating device, a third switch which when in a normal condition connects said switch means to said load device and when in an actuated condition connects said first switch means to said terminal, said time delay relay causing said third switch to move to its actuated condition at a predetermined interval of time after it is energized by said first switch means.

References Cited

UNITED STATES PATENTS

| | | | |
|---|---|---|---|
| 1,694,609 | 12/1928 | Willits | 340—249 |
| 2,413,020 | 12/1946 | Wolfner | 317—153 X |
| 2,573,035 | 10/1951 | Long | 340—244 |
| 2,623,969 | 12/1952 | Lyle | 200—152.4 |
| 2,700,153 | 1/1955 | Huckabee | 340—244 |
| 2,798,135 | 7/1957 | Graham | 200—152.4 |
| 2,839,742 | 6/1958 | Sumner | 340—244 X |
| 2,932,818 | 4/1960 | Lubkin | 340—244 |
| 2,999,230 | 9/1961 | Laakmann | 340—244 |
| 3,007,080 | 10/1961 | Benson. | |
| 3,106,666 | 10/1963 | Kuckens et al. | |
| 3,151,523 | 10/1964 | King | 317—142 X |
| 3,179,920 | 4/1965 | McGinty | 340—59 |
| 3,184,689 | 5/1965 | Wylde | 340—409 X |
| 3,210,749 | 10/1965 | Magor. | |

NEIL C. READ, *Primary Examiner.*

D. MYER, *Assistant Examiner.*

UNITED STATES PATENT OFFICE
CERTIFICATE OF CORRECTION

Patent No. 3,333,258                      July 25, 1967

Richard E. Walker et al.

It is hereby certified that error appears in the above numbered patent requiring correction and that the said Letters Patent should read as corrected below.

Column 1, line 19, for "particularly" read -- particular -- column 6, line 60, for "livel" read -- level --; column 7, line 23, for "said", third occurrence, read -- the --; line 24, for "deliver said" read -- delivers a --; line 25, for "said", second occurrence, read -- a --; same line 25, for "said", first occurrence, read -- the --; column 7, lines 36 and 43, and column 8, line 16, for "solonoid", each occurrence, read -- solenoid --.

Signed and sealed this 25th day of June 1968.

(SEAL)
Attest:

Edward M. Fletcher, Jr.                           EDWARD J. BRENNER
Attesting Officer                                 Commissioner of Patents